March 31, 1931.  F. CHADISTER  1,798,369

PLANTER ATTACHMENT FOR CULTIVATORS

Filed April 27, 1928   3 Sheets-Sheet 1

Inventor
Fred Chadister

By Clarence A. O'Brien
Attorney

March 31, 1931.  F. CHADISTER  1,798,369
PLANTER ATTACHMENT FOR CULTIVATORS
Filed April 27, 1928  3 Sheets-Sheet 2
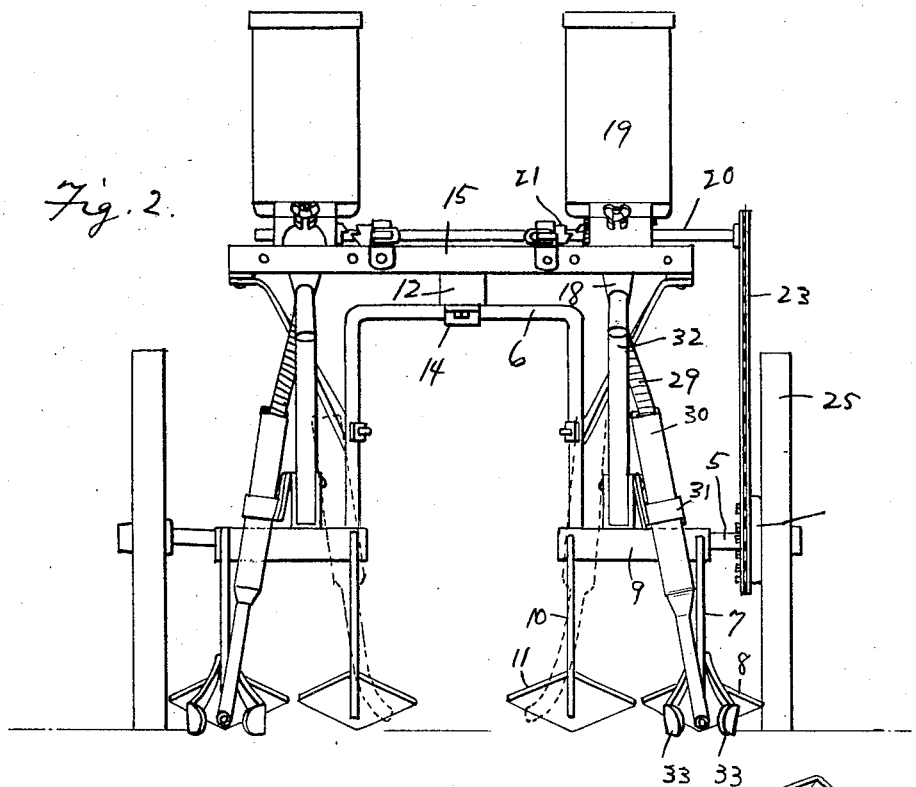
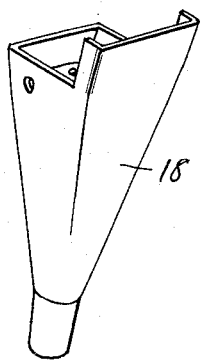
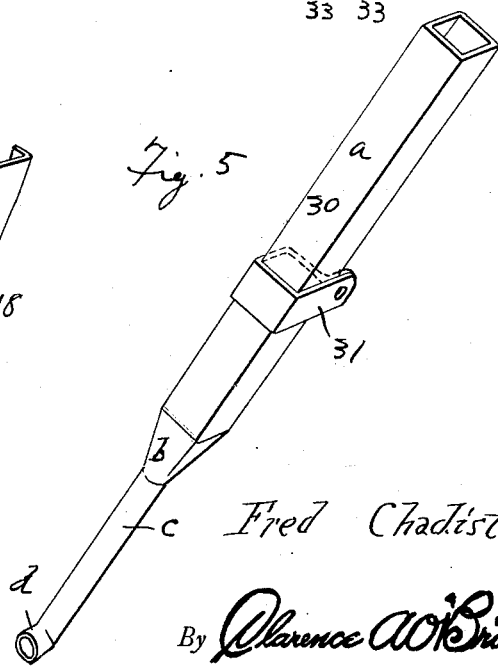
Inventor
Fred Chadister
By Clarence A. O'Brien
Attorney March 31, 1931.  F. CHADISTER  1,798,369
PLANTER ATTACHMENT FOR CULTIVATORS
Filed April 27, 1928    3 Sheets-Sheet 3

Inventor
Fred Chadister

By Clarence A. O'Brien
Attorney

Patented Mar. 31, 1931

1,798,369

UNITED STATES PATENT OFFICE

FREDERICK CHADISTER, OF ALICIA, ARKANSAS

PLANTER ATTACHMENT FOR CULTIVATORS

Application filed April 27, 1928. Serial No. 273,300.

The present invention relates to an attachment for cultivators and has for its prime object to provide a planter structure which may be conveniently mounted on a cultivator so that corn and peas may be planted simultaneously with the cultivating operation.

Another very important object of the invention resides in the simplicity of construction, strength and durability.

A still further important object of the invention resides in the provision of an attachment of this nature, which is exceedingly simple in its attachment to the cultivator, is inexpensive to manufacture, and is thoroughly efficient and reliable in operation.

With the above and numerous other objects in view, the invention resides in certain novel features of combination and in the combination and arrangement of parts as will be hereinafter more fully described and claimed.

In the drawing:

Figure 2 is a rear elevation thereof.

Figure 4 is a perspective view of one of the hoppers.

Figure 5 is a perspective view of one of the planter boots.

Figure 1:
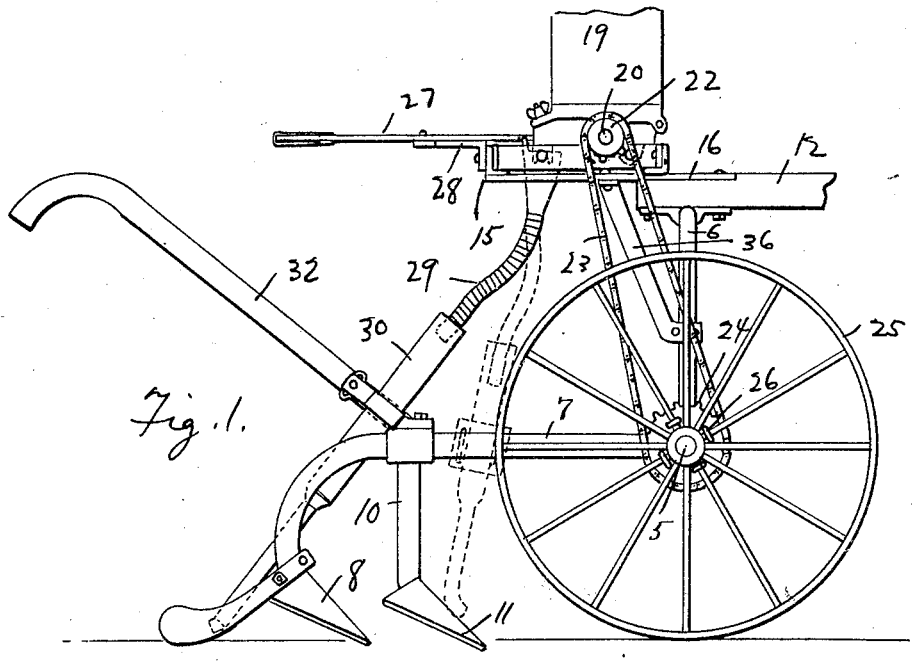
Figure 1 is a side elevation of a cultivator showing my attachment thereto.
Figures 6, 7, 8:
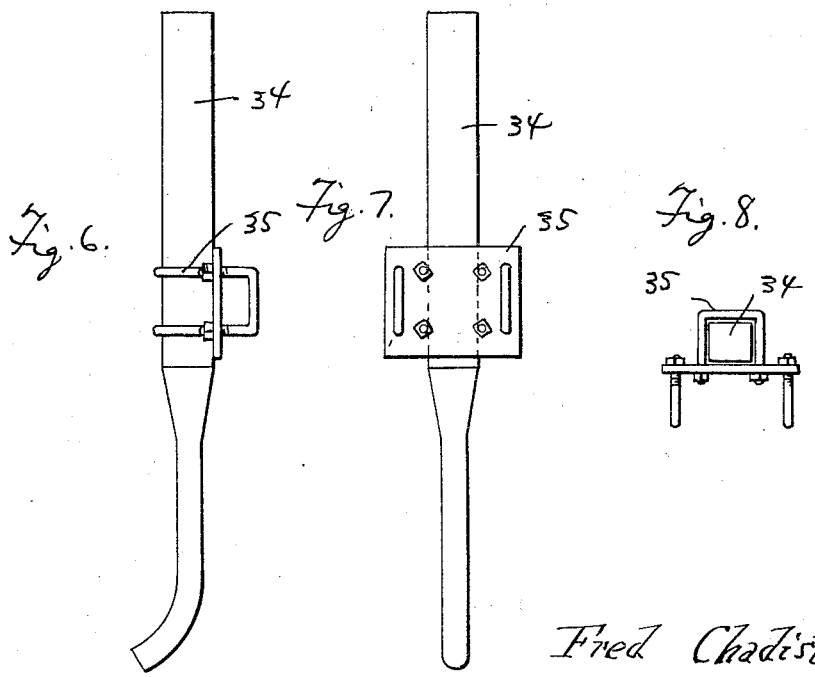
Figure 6 is a side elevation of another planter boot especially adaptable for planting of peas and forming a part of my invention.
Figure 7 is an other side elevation of the boot shown in Figure 6.
Figure 8 is a top plan view of the same.
Figure 3:
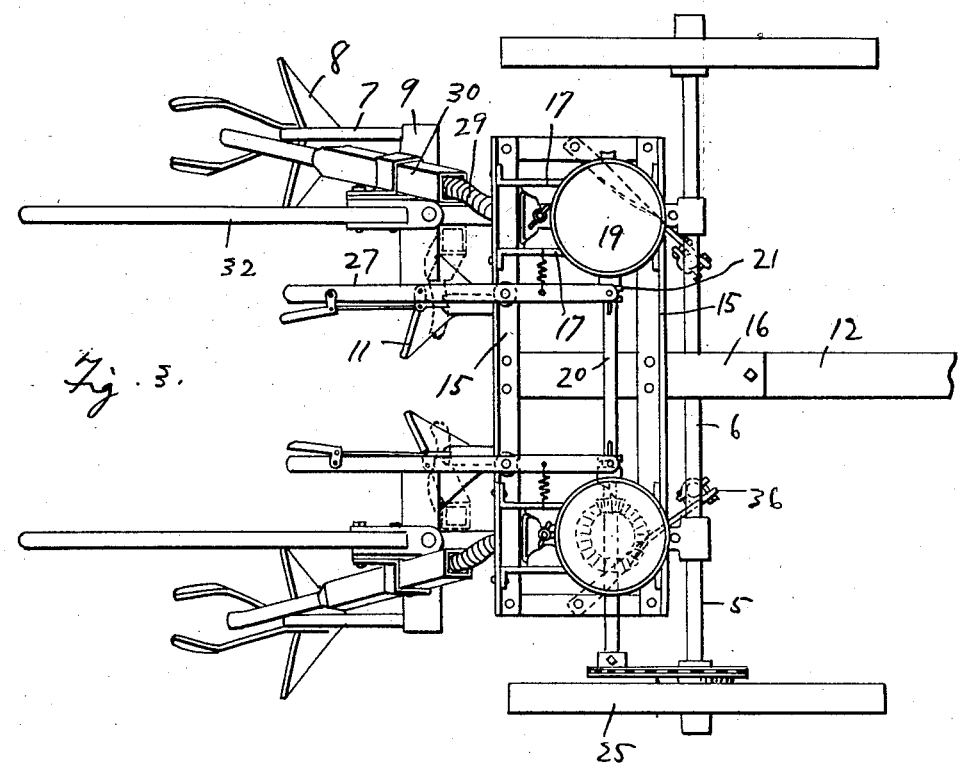
Figure 3 is a top plan view thereof.
Figure 9:
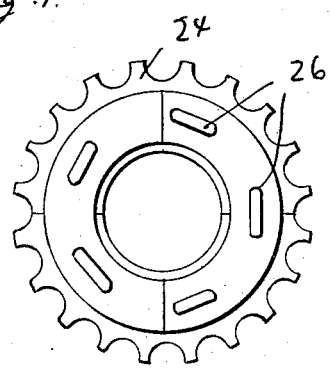
Figure 9 is a side view of the operating sprocket.
Figure 10:
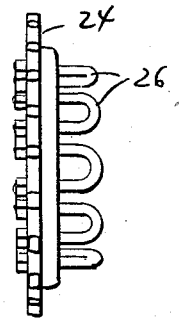
Figure 10 is an edge view thereof.

Referring to the drawing in detail, it will be seen that the cultivator illustrated in the drawing is conventional, comprising an axle 5, with a center arch 6 rising therefrom. The cultivator shovel beams 7 extend rearwardly from the axle 5 and have their rear ends curved downwardly in the usual manner and have shovels 8 attached thereto in the usual manner.

Inwardly directed members 9 are attached to the intermediate portion of the beams 7 and support at their inner ends standards 10 depending therefrom, on which are mounted shovels 11. It will be noted that the shovels 11 are disposed between the shovels 8 and forwardly thereof. The main frame beam 12 is fixed to the center of the arch 6 as at 14.

A rectangular frame 15 is disposed transversely of the cultivator being mounted on a plate 16 which is attached to the rear end of the beam 12. The frame has two pairs of bars 17 one adjacent each end. Hoppers 18 are mounted between the rear portions of these bars 17 for receiving seed from seed boxes 19 rising from the bars 17. A shaft 20 through clutches 21 operates seed dropping mechanism, (not shown), in the upper portions of hoppers 18. A sprocket 22 is fixed on the right hand end of the shaft 20 and has a chain 23 trained thereover. A sprocket 24 is engaged with the spokes of the right hand one of wheels 25, on the axle 5, near the hub thereof by U-bolts 26.

The chain 23 is trained thereover. Therefore, as the cultivator moves along, the shaft 20 is rotated, and the planter mechanisms may be brought into operation by engaging the clutches 21 through levers 27, fulcrumed on brackets 28 extending rearwardly from the frame 15.

Flexible tubes 29 extend downwardly from the hoppers 18. Boots 30 have upper square tubular portions a merging at their bottom ends into tapered portions B, which merge into rounded tubular extensions c, the terminals of which are abruptly offset rearwardly as is indicated at d. Clamps 31 are disposed about the square portion a of the boot 30 and are attached to handle bars 32 of the cultivator structure. These boots 30 are utilized for planting corn and terminate immediately rearwardly of the shovels 8 and covering fingers 33 are fixed to the beams 7 immediately above the shovels 8 to diverge rearwardly and terminate in inwardly and rearwardly converging terminals behind the terminal d. When it is desired to plant the peas, boots 34 are substituted for the boots 30 and the flexible tubes 29 then disposed so that the terminals of the boots 34 are disposed on the inner sides of the shovels 11, and the terminals of the boots 34 being curved laterally whereby the peas may be discharged into a suitable receiver as is the customary method, while plowing. The boots 34 are similar to boots 30 except that the terminals are curved laterally.

Braces 36 are secured to intermediate portions of the risers of the arch 6 and to the ends of the frame 15 for steadying the support of this frame.

It is thought that the construction, operation, utility and advantages of this invention will now be quite apparent to those skilled in this art without a more detailed description thereof.

The present embodiment of the invention has been disclosed in detail merely by way of example, since in actual practice it attains the features of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. A planting attachment for cultivators, wherein the cultivator comprises a wheeled axle having a central arch rising therefrom, beams on the axle, cultivator shovels on the beams, a frame beam projecting forwardly from the center of the arch, handle bars extending upwardly and rearwardly from the first mentioned beams, said attachment comprising a frame, a plate to which the frame is attached, said plate being mounted on the rear end of said frame beam, planter boxes on said frame, one at each end thereof, hoppers depending from the frame and from the planter boxes, flexible tubes leading downwardly from the hoppers, a sprocket, means for detachably engaging the sprocket on one of the wheels of the axle, a shaft for operating the planter boxes, a sprocket on said shaft, a chain trained over said sprocket, boots, means for clamping said boots to said handle bars to one side of the first mentioned beams, said flexible tubes leading into the upper ends of said boots, and the lower ends of said boots terminating behind some of the shovels, each boot comprising an upper squared tubular portion merging into a downwardly tapered portion terminating in a rounded tubular portion, the terminal of which is offset rearwardly.

2. A planting attachment for cultivators, wherein the cultivator comprises a plurality of rearwardly extending beams, shovels on the beams, and handle bars rising upwardly and rearwardly from said beams, said attachment comprising a frame, means for mounting said frame on the cultivator above said beams, a pair of planter boxes mounted on said frame, hoppers depending from said frame and from the planter boxes, flexible tubes leading downwardly from the hoppers, boots attached to said handle bars, each boot comprising an upper squared tubular portion merging into a downwardly tapered portion terminating in a rounded tubular portion, the terminal of which is offset rearwardly, said last mentioned means including clamps engageable about said handle bars, said clamps being secured to the intermediate portions of said boots for securing said boots in an inclined position on said handle bars, flexible tubes leading from said hoppers into the upper ends of said boots, covering fingers attached to the shanks of said shovels, and diverging from each other rearwardly and terminating in rearwardly and inwardly converging portions behind the terminals of said boots.

In testimony whereof I affix my signature.

FREDERICK CHADISTER.